United States Patent [19]
Mellecker

[11] Patent Number: 4,856,997
[45] Date of Patent: Aug. 15, 1989

[54] ARCHITECTURAL SCALE MODEL VIEWER AND METHOD FOR USING

[76] Inventor: Joseph L. Mellecker, 2373 Haskell Way (P.O. Box 172), Watkins, Colo. 80137

[21] Appl. No.: 175,205

[22] Filed: Mar. 30, 1988

[51] Int. Cl.$^4$ .................. G09B 25/00; G02B 17/06
[52] U.S. Cl. .................. 434/72; 350/623; 350/113
[58] Field of Search ............ 434/72, 90, 76, 331, 434/371; 350/113, 616, 617, 623, 631, 603, 102, 618, 621, ; 33/20.1, 20.3, 18.3, 290; 40/903

[56] References Cited

U.S. PATENT DOCUMENTS

| | | | |
|---|---|---|---|
| 1,041,622 | 10/1912 | Guilfoyle | 33/290 |
| 1,258,339 | 3/1918 | Jansen | 350/616 |
| 1,584,938 | 2/1922 | Higbee, Jr. | 350/623 |
| 3,564,734 | 2/1971 | Abraham | 434/76 |
| 3,742,616 | 7/1973 | Heller | 434/331 |
| 3,908,278 | 9/1975 | Sundahl | 33/168 R |
| 4,375,316 | 3/1983 | Le Vantine | 350/623 |
| 4,445,870 | 5/1984 | Grana | 434/76 |
| 4,500,169 | 2/1985 | Donnelly | 434/371 |

Primary Examiner—Edward M. Coven
Assistant Examiner—Valerie Szczepanik
Attorney, Agent, or Firm—Dorr, Carson, Sloan & Peterson

[57] ABSTRACT

A device for viewing architectural scale models from the same eye level perspective of a normal sized person viewing the full scale buildings. The device comprises a horizontal base component having a mirror thereon and a vertical component adjustably mounted to the base component with a second mirror mounted on the vertical component. An image of a model placed in front of the device is reflected from the second mirror on to the horizontal mirror. A viewfinder is formed on the vertical component so that a person looking through the viewfinder can observe the reflected image of the model. The device includes adjustable joints to adjust the device to a range of scale settings.

14 Claims, 4 Drawing Sheets

ARCHITECTURAL SCALE MODEL VIEWER AND METHOD FOR USING

BACKGROUND OF THE INVENTION

1. Field of Invention

This invention relates to a device and method for viewing architectural scale models from an eye level perspective.

2. Discussion of Prior Art

One of the problems in normally viewing architectural scale models such as residential housings, commercial buildings, or city layouts is that a person viewing the model looks down on the model from a "birds-eye" or aerial perspective which does not give a realistic view of how the actual building will actually look. The view of a model from "above" does not accurately portray the view of a model at "ground level" and a commercial need exists to enable, for example, a prospective home buyer in a subdivision to view a model of his new house as if he were walking up to it on the sidewalk.

Prior art devices for viewing scale models do not solve this problem. For example, U.S. Pat. No. 3,564,734 discloses a device for viewing a simulated article of furniture having the appearance of various types of fabrics superimposed. This device utilizes only one mirror to observe a simulated article design imposed on a plate mirror. Another device as disclosed in U.S. Pat. No. 4,445,870 allows a photograph to be reflected against a variety of environments. Other prior art devices such as U.S. Pat. No. 3,742,616 disclose a box having a mirror surface disposed at an angle with a viewing slot disposed above the mirror for observing a reflected image.

None of these devices are capable of viewing a three dimensional architectural scale model from the eye level perspective of a normal sized person. There is no readily available apparatus for a person to look at a scale model from an eye level viewpoint thus allowing them to see a true picture of what the building will look like from all sides and at eye level.

Furthermore, it is desirable to have the same viewer function for different scales of architectural models such as scales of ¼ inches equal 1 foot, ⅛ inch equal 1 foot, etc. In this fashion, such a viewer can be readily adopted to function for different scale settings.

It is therefore an object of this invention to provide a device for viewing an architectural scale model from an eye level perspective of a normal sized person.

A further objective of this invention is to provide a device which may be adjusted to a variety of different size scale models.

A further object of this invention is to provide a device which is compact and can easily be transported in a briefcase.

SUMMARY OF THE INVENTION

These and other objects of this invention are accomplished by the device of the present invention which includes a viewer comprising a horizontal base component having a first mirror mounted on the base, a vertical component adjustably mounted on the base component, a second mirror mounted on the vertical component so as to reflect from the first mirror and a viewfinder mounted on the device to view a scale model as reflected from the mirrors. The device further comprises a calibrated scale model which allows the viewer to be adjusted to the particular scale of the model to be viewed. The calibrated scale model comprises a triangular shaped scale having dark horizontal lines corresponding to the scale settings.

In utilizing the present invention, the calibrated scale model is placed in front of the viewer so that the desired scale setting is nearly perpendicular to the viewer. The gross adjustment means are set in position according to the desired scale setting. Then the fine adjustment means are loosened so that the vertical component can be tilted until the dark horizontal line appears as a dot when viewed through the viewfinder. The adjustment means are then locked tight and the viewer is placed on the same horizontal plane as the model to be viewed. The model can then be viewed through the viewer at an eye level perspective.

DESCRIPTION OF THE PREFERRED EMBODIMENT

Figure 1:
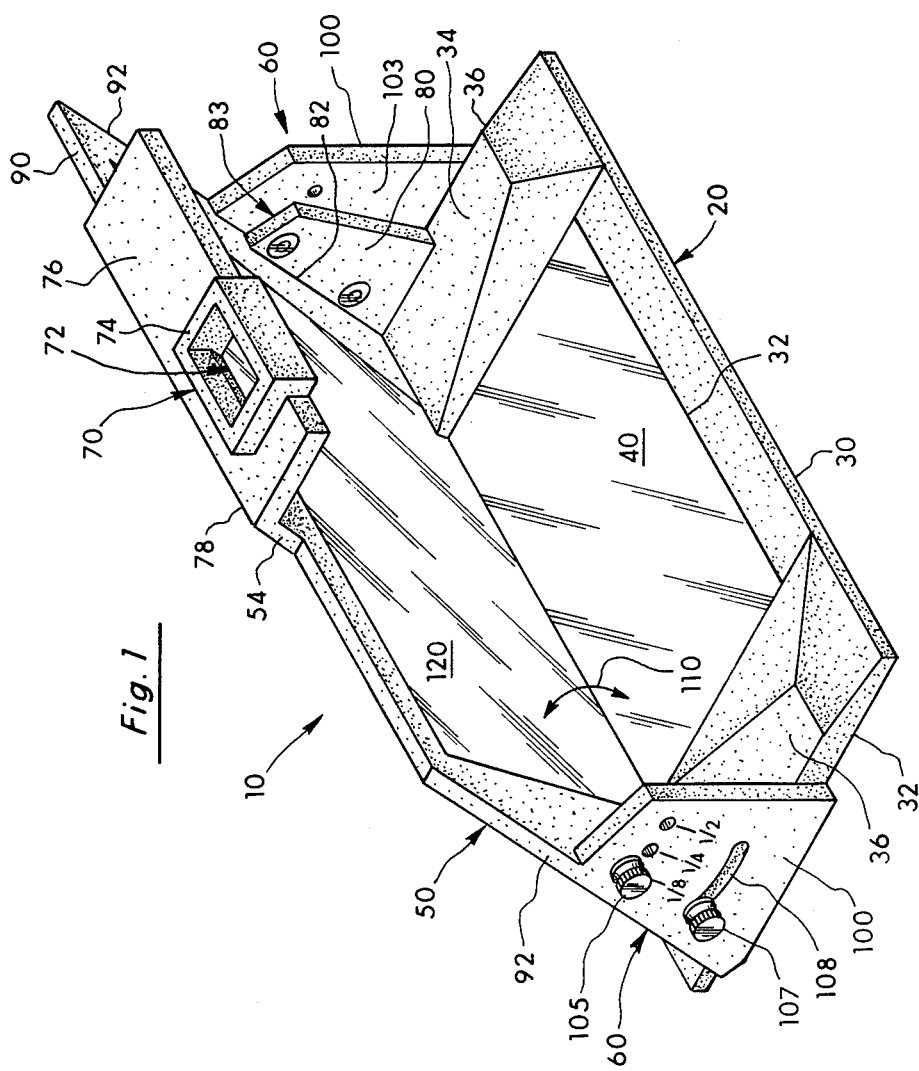
FIG. 1 is a front perspective view of the device.
Figure 2:
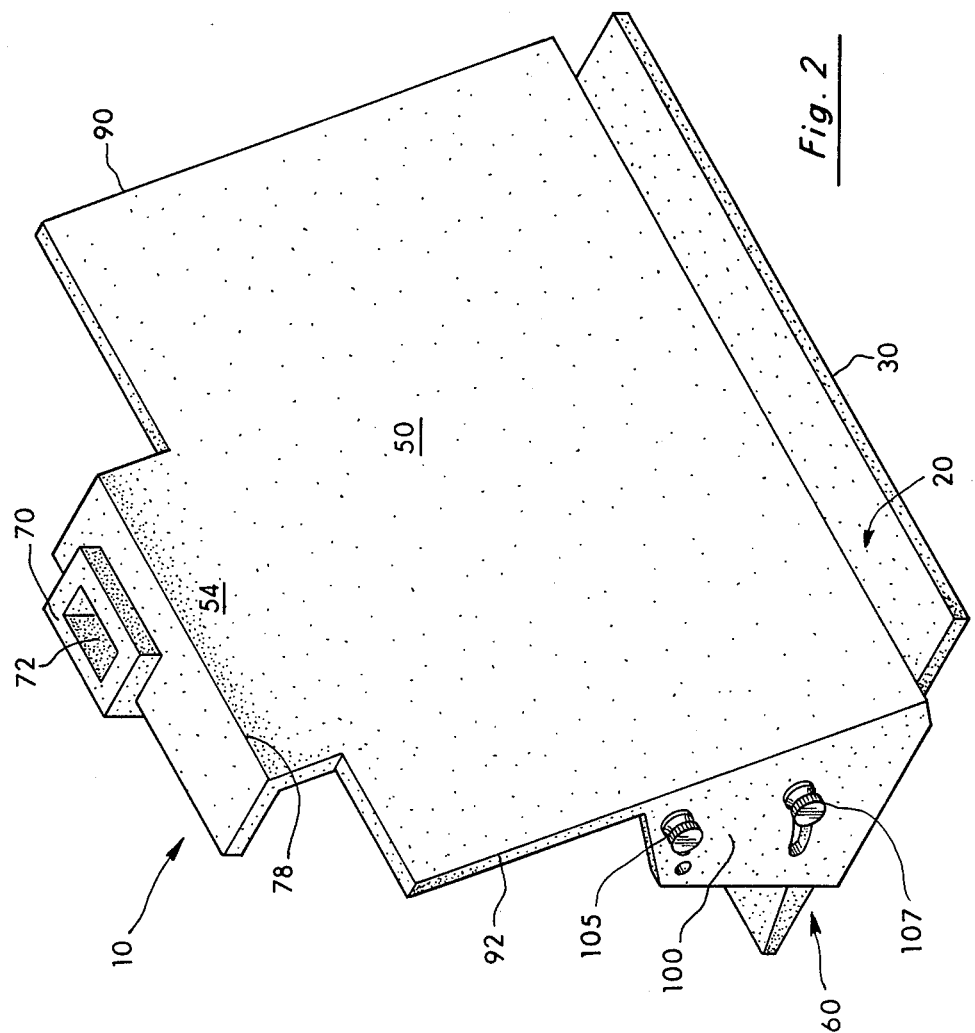
FIG. 2 is an perspective view of the reverse side of the invention.

The preferred embodiment of the viewer 10 of the present invention is shown in FIGS. 1 and 2. The viewer 10 comprises a horizontal base component 20 in the form of a rectangular plate 30 such as steel, wood or other suitabe and durable material. The center portion 32 of the plate is recessed and a mirror 40 composed of glass is mounted flat in the recess 32 of the plate. The viewer 10 further comprises an adjustable vertical component 50 which is connected through an adjustment joint 60 to the horizontal base component 20 so that the viewer can be precisely adjusted for differing scales of the architectural models. On top of the vertical component 50 is a viewfinder 70 through which the user of the present invention 10 is able to see the model at the eye level perspective of the user walking up to the house.

Figure 3:
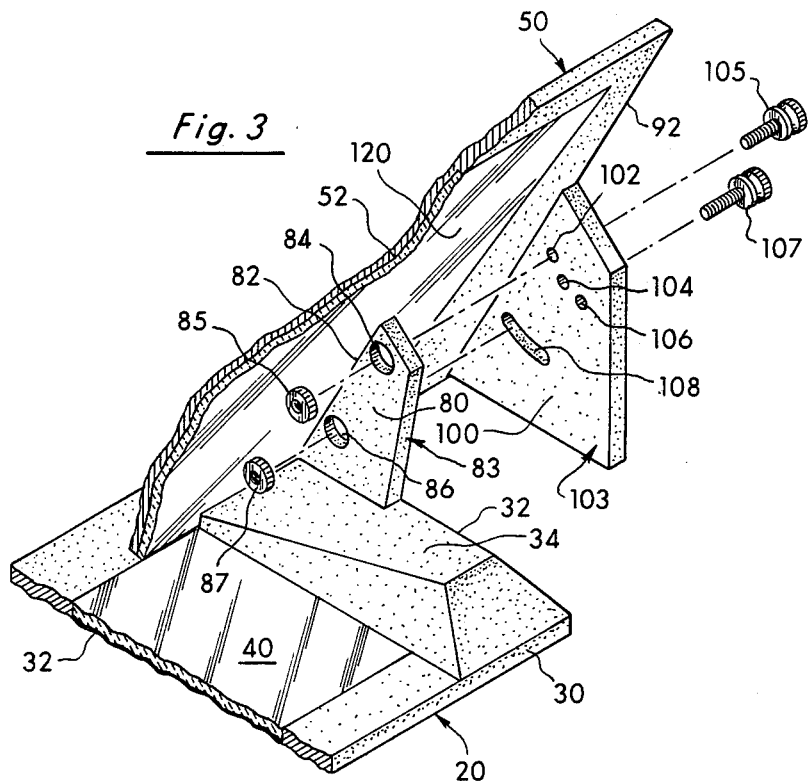
FIG. 3 is an exploded view of the connection between the horizontal base component and the adjustable vertical component.

The horizontal base component 20 has opposing trapezoidal shaped upstanding arms 80 extending vertically to the base at ends 36 of plate 30. The arms 80 engage the upper surface 34 of plate 30 and are integrally mounted thereto such as by welding, gluing or the like. The rear edges 82 of the arms 80 form an acute angle relative to the front edge of the base. As shown in FIG. 3, each upstanding arm 80 contains an aperture 84, as shown in FIG. 3, in its upper end and an aperture 86 in its lower end. A nut 85 is pressed into enters each aperture 84 and a nut 87 is pressed into each aperture 86. The nut 85 and 87 are knurled so as not to slip or turn when mounted in their respective apertures. While a preferred embodiment for the base 20 and the arms 80 are shown in FIGS. 1 to 3, it is to be expressly understood that other designs and configurations could be utilized such as, for example, an oval base 20 containing an oval mirror 40 with different designs for the upstainding arms 80.

The vertical component 50 includes a rectangular flat plate 90 having opposing trapezoidal shaped side arms 100 extending at right angles to the plate 90 on each side 92 of the plate. Each side arm 100 includes apertures 102, 104 and 106, as shown in FIG. 3, on its upper end and a slot 108 formed in its lower end. The vertical component 50 is mounted as shown in FIGS. 1 and 3 at an acute angle 110 to the base component 20 by inserting each screw 105 through one of the pairs of apertures 102, 104 or 106 into the nuts 85 in the arm 80 of the base component 20 and screws 107 through each of the slots 108 into the nuts 87 in the arm 80 of the base component. When fully assembled, the inner surface 103 of the vertical component arm 100 firmly abuts against the outer surface 83 of the horizontal base component 80. A mirror 120 is formed of glass and mounted flat in the vertical component 50 in a formed central recess 52. The vertical component 50 is acutely angled relative to the base component 20 so that an image is reflected from mirror 120 into mirror 40 as will be explained later.

The viewfinder 70 is formed on the top of the vertical component 50 to be substantially parallel to the base component 20 and to extend over the base component mirror 40. The viewfinder 70 includes a formed viewing hole 72 so that the image reflected from mirror 120 into mirror 40 can be observed by a person looking down through the formed viewfinder hole 72. In the preferred embodiment, the hole 72 is rectangular in shape but it is to be understood that circular or oval shaped holes 72 could also be used. The hole 72 is surrounded by a raised lip 74 and is positioned in a platform 76 which, as shown in FIGS. 1 and 2, is also rectangular in shape and extends in a plane substantially parallel to the plane containing mirror 40. The rear edge 78 of platform 76 is integrally attached to an upstanding rectangular portion 54 of the vertical component 50. It is to be expressly understood that the configuration of the vertical component 50 shown in the preferred embodiment could be mofified and still comport with the teachings of the present invention.

The calibration joint 60 works in the following fashion. The screws 105 and apertures 102, 104 and 106 provide for the gross adjustment of the viewer. The vertical component 50 is adjusted to a particular range of scale settings by inserting the screws 105 into the appropriate aperture 102, 104 and 106 as marked by indicia. The screws 107 and slots 108 form the fine adjustment means. The screw 107 are loosened, allowing the vertical component 20 to tilt relative to the base component along angle 110 to an exact scale view setting, then the screws 107 are tightened to lock the viewer 10 at that setting. While a preferred embodiment of the adjustment joint 60 has been shown, it is to be expressly understood that the joint could be modified to encompass other structural configurations that function under the teachings of the present invention.

Figure 4:
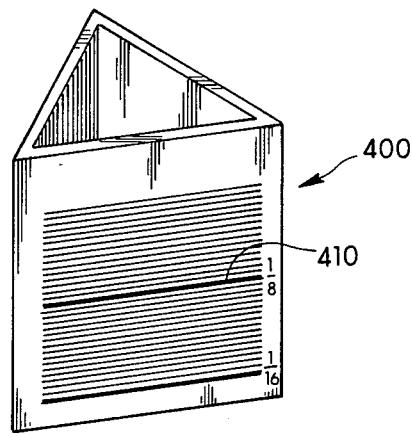
FIG. 4 is an perspective view of the calibrated scale model.
Figure 6:
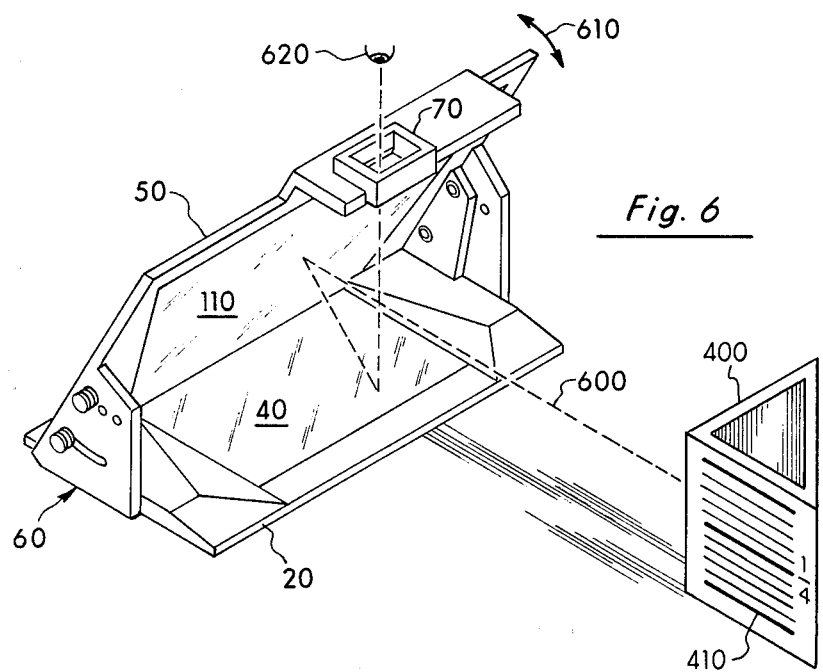
FIG. 6 is a view of the invention being adjusted.

The viewer 10 may be precisely adjusted by using the calibrated scale model 400 as shown in FIGS. 4 and 6. The calibrated scale model 400 is a triangular shaped scale model having dark horizontal lines 410 printed on each side. Each set of dark lines signifies a different scale setting. The scale settings range from one-sixteenth inch to one-half inch scales and the spacings between the lines 410 are accurately made to correspond to a particular scale setting.

Figure 5:
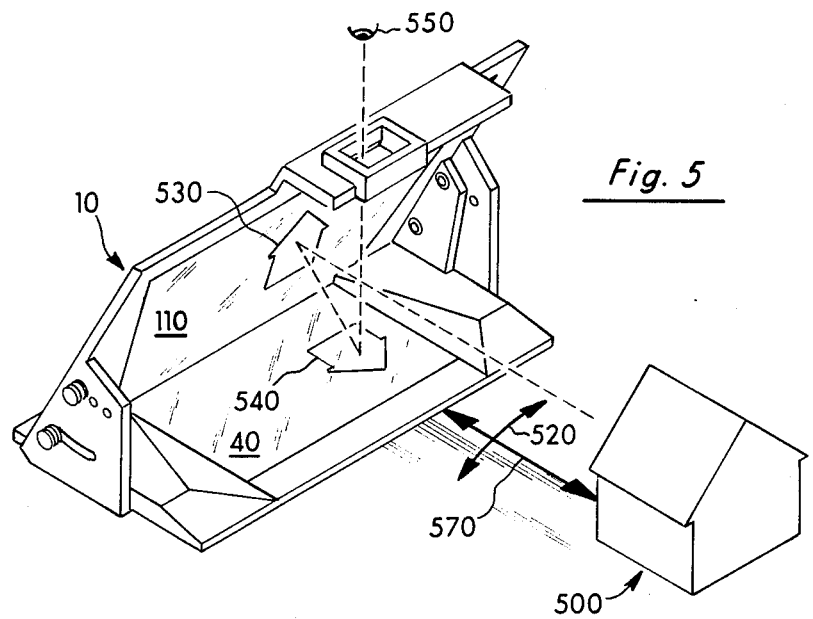
FIG. 5 is a view of an architectural scale model being viewed by the invention.

In utilizing the present invention, the viewer can be already preset to a specific setting at the factory or the user can precisely adjust the viewer to a desired scale setting. As shown in FIG. 1, the viewer 10 is adjusted at $\frac{1}{8}''=1'$, $\frac{1}{4}''=1'$, and $\frac{1}{2}''=1$ settings at the gross adjustment holes of 102, 104 and 106 respectively. This is an optional approach to adjustment. If the user decides to ajdust the viewer to a desired setting, first the scale of the architectural model to be viewed is determined—such as $\frac{1}{8}$ inch equals 1 foot. The screws 105 are then inserted into the appropriate aperture 102, 104 or 106 on the vertical component as discussed below. The calibrated scale model 400 is placed in front of the viewer so that the dark horizontal line corresponding to the desired scale setting of the model is near perpendicular to the longitudinal length of the viewer as shown in FIG. 6 by line 600. The vertical component 50 is then tilted, as shown by arrow 610, relative to the base component 20 while observing with the eye 620 the calibrated scale model 400 through the viewfinder 70. The viewer 10 is adjusted to the desired scale setting when the dark line 410 corresponding to that scale setting appears as a dot through the viewfinder. The line 410 will appear to be slanted with respect to the horizontal surface on which it rests when the viewer is not adjusted properly. Once the viewer is calibrated, then the screws 105 and 107 can be tightened to securely lock the viewer in position. The viewer can then be placed on the same horizontal surface as the architectural model. The model or viewer can be rotated and moved closer or farther away while giving the viewer the same perspective as a person viewing the full scale building. In FIG. 5, a model 500 of a residential house is shown. The distance 510 between the viewer 10 and the model 500 can vary as well as the angle 520 of the viewer 10 around the model 500. This gives the user of the viewer significant flexibility in using the present invention to inspect various areas of the model. The model 500 is first reflected by mirror or reflective surface 120 which produces image 530. Image 530 is then reflected by mirror or reflecting surface 40 which produces image 540 which is the image seen by the eye 550 of the user.

The viewer 10 is designed to be quickly assembled and disassebled for ease of transport. To disassemble the viewer, screws 105 and 107 are removed from the device and the components 20 and 50 are separated. In the preferred embodiment, the device when diassembled is only two and one-half inches tall. This allows it to be transportable in a briefcase or the like. To reassemble the viewer, the apertures and slots of the vertical component are matched to the appropriate apertures of the base component and the screws tightened as previously discussed.

It is to be understood that the above described embodiment of the invention is merely illustrative of the principles thereof and that numerous modifications and embodiments of the invention may be derived within the spirit and scope thereof.

I claim:

1. A scale model viewer for viewing an architectural scale model from an eye level perspective, said viewer comprising a base component, a first reflective surface on said base component, a vertical component angularly mounted on said base component, a second reflective surface on said vertical component to reflect from said model for producing a first image of said model, said first reflective surface receiving said first image from said second reflective surface for producing a second image of said model; a viewfinder for viewing said second image of said model on said first reflective surface, and adjusting means comprising separate gross adjustment means and fine adjustment means to adjust said viewer to different scale settings, said gross adjustment means comprising means to change the angular mounting of said vertical component relative to said base component.

2. The viewer of claim 1 wherein said gross adjustment means comprise at least two mounting holes on each side of one of either said base component or said vertical component, a single mounting hole on each side of the other of said base component or said vertical component and fastening means mounting through only one of said at least two mounting holes on each of said sides to said single mounting holes, whereby the selection of said mounting holes provides said gross adjustment of said viewer.

3. The viewer of claim 1 or 2 wherein said fine adjustment means comprise at least one slot and screw means to allow said vertical component to tilt relative to said base component for fine adjustment of said viewer.

4. A scale model viewer for viewing an architectural scale model from an eye level perspective, said viewer comprising a base component, a first reflective surface on said base component, a vertical component angularly mounted to said base component, a second reflective surface on said vertical component to reflect from said model for producing a first image of said model, said first reflective surface receiving said first image from said second reflective surface for producing a second image of said model, a viewfinder for viewing said second image of said model on said first reflective surface, means to adjust said viewer to different scale settings, said adjusting means comprising gross adjustment means and fine adjustment means, and said viewer further comprising a calibrated scale model to precisely adjust said viewer to different scale settings.

5. A scale model viewer for viewing architectural scale models from an eye level perspective, said viewer comprising a horizontal base component, a first reflective surface mounted flat on said base component, a vertical component with means to adjustably mount said vertical component on said base component, a second reflective surface mounted on said vertical component so as to reflect from said first reflective surface, a viewfinder for viewing a model reflected off said first reflective surface onto said second reflective surface and separate gross adjustment means and fine adjustment means to adjust said viewer to different scale settings, said gross adjustment means comprise means to change the angular mounting of said vertical component relative to said base component.

6. The viewer of claim 5, wherein said gross adjustment means comprise at least two mounting holes on each side of one of either said base component or said vertical component, a single mounting hole on each side of the other of said base component or said vertical component and fastening means mounting through only one of said at least two mounting holes on each of said sides to said single mounting holes, whereby the selection of said mounting holes provides said gross adjustment of said viewer.

7. The viewer of claim 5 or 6, wherein said fine adjustment means comprise at least one slot and screw means to allow said vertical component to tilt relative to said base component for fine adjustment of said viewer.

8. A scale model viewer for viewing architectural scale models from an eye level perspective, said viewer comprising a horizontal base component, a first reflective surface mounted flat on said base component, a vertical component with means to adjustably mount said vertical component to said base component, a second reflective surface mounted on said vertical component so as to reflect from said first reflective surface, a viewfinder for viewing a model reflected off said first reflective surface onto said second reflective surface, gross adjustment means and fine adjustment means to adjust said viewer to different scale settings and said viewer further comprising a triangular shaped calibrated scale model including at least one scale setting on each side of said model comprising a dark horizontal line which, viewed through said viewfinder of said scale model viewer, indicates the eye level perspective of an average sized person at that scale.

9. The viewer of claim 8, wherein said calibrated scale model comprises scale settings ranging from one-sixteenth inch to one-half settings.

10. A scale model viewer for viewing an architectural scale model from an eye level perspective, said viewer comprising a horizontal base component, a vertical base component and means for connecting said vertical component adjustably on said base component; said horizontal base component further comprising a first flat plate having a formed recess in the center of sid plate, a first reflecting surface mounted within said formed recess, upstanding side arms on each side of said first plate with the rear edges of said side arms extending at an acute angle relative to the front edge of said first plate; and said vertical component further comprising a second flat plate having a recess formed in the center portion of said vertical component, a second reflective surface mounted within said recess, downwardly extending arms perpendicular to said second plate of said vertical component on opposing sides thereof so as to mate with said arms of said base component, means for connecting said arms of said base component to said arms of said vertical component at a predetermined scale setting and a viewfinder formed on the upper end of said vertical component so that said model in front of said viewer is reflected from said vertical component mirror on to said base component mirror where it can be observed through said viewfinder at said predetermined scale setting.

11. A viewer for viewing an object from an eye level perspective; said viewer comprising a base component, a first reflective surface on said base component, a vertical component angularly mounted on said base component, a second reflective surface on said vertical component to reflect an image of said object onto said first reflective surface, and separate gross adjustment means and fine adjustment means to adjust said viewer to view different sized objects, said gross adjustment means comprising means to change the angular mounting of said vertical component relative to said base component, wherein said gross adjustment means comprise at least two mounting holes on each side of one of either said base component or said vertical component, a single mounting hole on each side of the other of said base component or said vertical component and fastening means mounting through only one of said at least two mounting holes on each of said sides to said single mounting holes, whereby the selection of said mounting holes provides said gross adjustment of said viewer.

12. The viewer of claim 11 wherein said fine adjustment means comprise at least one slot and screw means to allow said vertical component to tilt relative to said base component.

13. The viewer of claim 11 wherein said viewer further comprises a viewfinder formed on the upper end of said vertical component so that said object in front of said viewer is reflected from said vertical component mirror on to said base component mirror where it can be observed through said viewfinder.

14. A method of using a scale model viewer for viewing architectural scale models from an eye level perspective, wherein the viewer comprises adjustment mechanisms including gross adjustment means and fine adjustment means, the method comprising the steps:

(a) determining the scale of the model to be viewed, (b) selecting the proper position of the gross adjustment means of the viewer for that scale, (c) placing a calibrated scale model having a dark horizontal line corresponding to the scale setting of the model to be viewed in front of th viewer so the line is nearly perpendicular to the longitudinal axis of the viewer and can be seen through a viewfinder on the viewer.

(d) adjusting the fine adjustment on the viewer until the dark line on the scale model becomes a dot, (e) locking the adjustment mechanisms, and (f) viewing the architectural model through the viewfinder at the determined scale setting.

* * * * *